Aug. 5, 1952　　　　　E. D. PARSONS　　　　2,605,685
COMBINATION STRIP FILM HOLDER AND GUIDE
Filed Aug. 30, 1948
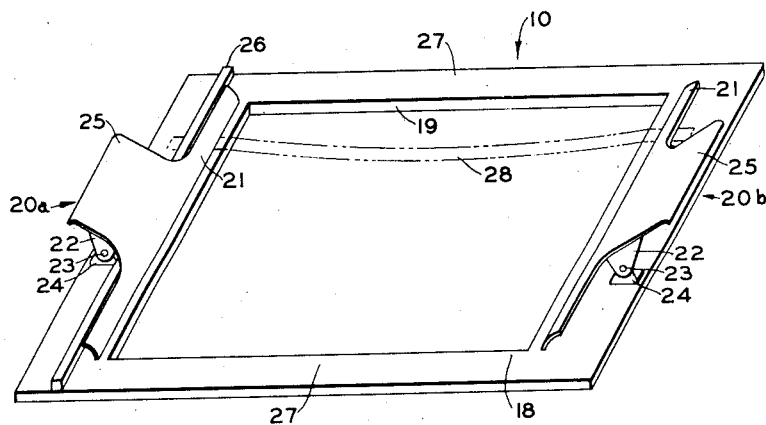
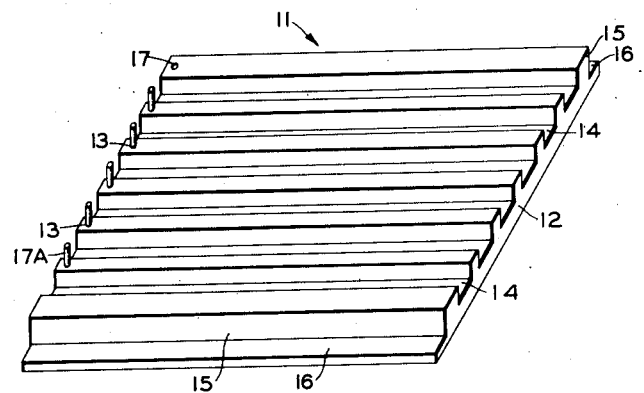
INVENTOR.
E. D. PARSONS
BY Hudson & Young
ATTORNEYS Patented Aug. 5, 1952

2,605,685

UNITED STATES PATENT OFFICE 2,605,685

COMBINATION STRIP FILM HOLDER AND GUIDE

Edwin D. Parsons, Bartlesville, Okla., assignor to Phillips Petroleum Company, a corporation of Delaware Application August 30, 1948, Serial No. 46,786

2 Claims. (Cl. 95—100)

This invention relates to a combination strip film holder and guide assembly. In another aspect, it relates to the film holder and guide making up such assembly.

In photographic work, and particularly in the development of spectrograph films, several very small strips of film must be immersed in the developing solution without contacting each other and without contacting the fingers of the operator in such fashion as to produce finger prints on the exposed portion of the film. This is difficult, particularly since the developing operation must be carried out in complete darkness.

It is an object of the invention to provide a combination strip film holder and guide to permit the film to be handled in complete darkness while preventing contact of the films with each other or with the fingers of the operator.

It is a further object of the invention to provide individual film holder and guide units of novel construction.

It is a still further object of the invention to provide such a film holder and guide assembly which is convenient in operation, of low cost, and easy to manufacture.

Various other objects, advantages and features of the invention will become apparent from the following detailed description taken in conjunction with the accompanying drawing, in which:

The figure is a view of the combination strip film holder and guide with the parts in disassembled relation.

Referring now to the drawing in detail, the assembly comprises a film holder 10 and a guide 11 which are adapted to fit together, thereby forming a unitary assembly. The guide 11 is formed from a metal plate 12, preferably of brass, having a series of longitudinal projections 13 which define a set of slots 14, each of which is adapted to receive a strip of film. A longitudinal cut-away portion 15 extends along each side of the series of projections 13 and each cut-away portion defines a seat 16 having its surface depressed below the level of the slots 14. These seats are adapted to receive the film holder 10 in the manner hereinafter described.

Each of the projections 13 has a small opening 17 formed at one end thereof, and these openings are spaced equal distances from the end of the film guide. Each opening is adapted to receive a pin 17a, to indicate whether or not the slot with which it is associated is empty, as will be pointed out hereafter.

The holder 10 includes a frame 18, preferably of stainless steel, having a generally rectangular opening 19 formed therein. Spring clips 20a, 20b are mounted at opposite ends of the frame and each clip includes a transverse gripping member 21 which is engageable with the frame and extends substantially the entire width of the opening 19. Each clip further includes a set of ears 22 which are pivoted at 23 to supports 24 on the frame. A suitable spring, not shown, urges each member 21 into engagement with the frame so that it is adapted to grip the ends of film strips protruding beyond the ends of the slots 14 in the guide. Each gripper portion 21 may be released from engagement with the frame by pressure exerted upon a handle 25 forming an integral part of each of the clips. A transversely extending stop 26 is mounted at one end of the frame, this stop being disposed between the pivot 23 and the gripper portion 21 of the adjacent clip 20a. The stop 26 may be formed from a material such as stainless steel. If desired, a steel hook may be disposed about the pivot 23, to allow the holder to be hung in the developing tank or on a drying rack.

In operation, the guide 11 is inserted into the opening 19 of the film holder so that the sides 27 of the holder rest upon the seat portions 16 of the guide. In this position, the slots 14 are at the same level as the upper surface of the frame, due to the fact that the seats 16 are depressed below the surface of the slots 14. Thereupon, the end of a film strip is placed in one of the slots 14 and moved longitudinally thereof until one end of the strip engages stop 26, it being understood that the clip 20a is held in open position during this operation. Clip 20a is then released, thereby clamping the adjacent end of the film in correct position. Clip 20b is then opened, and the other end of the film strip falls into its correct position within the guide slot so that its other end is positioned beneath the clip 20b. Thereupon, this clip is released and the film is clamped at both ends in its correct position within the holder, for example, in the position shown by the film strip 28 diagrammatically illustrated in the figure. This operation is repeated several times with the result that several strips of film are clamped in the film holder in their correct positions. When the operation is started, a pin 17a is disposed in each of the openings 17. These pins are removed, one by one, as the film strips are inserted into the respective slots 14. Thus, the presence of the pin indicates that the slot with which it is associated is empty, thereby enabling empty slots to be readily located in the dark without danger of producing fingerprints on the film. The guide is then removed and the holder, with the film inserted therein, is carried through the developing process which may include the steps of developing, rinsing, fixing, washing, and drying.

It has been found that the film may be very conveniently handled by the use of the novel film holder and guide assembly so that the strips do not contact each other and the exposed portions are not touched by the fingers of the operator. Considerable variations may be made in the number of slots in the guide so that a large number of film strips may be simultaneously developed. I have found that a considerable saving in developing time results and that the film may be very conveniently handled. The convenience of operation is not affected by the fact that the developing operations must be carried out in complete darkness.

While the invention has been described in connection with a present preferred embodiment thereof, it is to be understood that this description is illustrative only and is not intended to limit the invention, the scope of which is defined by the appended claims.

Having described my invention, I claim:

1. In a combination strip film holder and guide, a metal plate having a series of elongated parallel slots formed therein each adapted to receive a strip of film, an opening formed in each of the raised portions defined by the respective slots, a pin removably mounted in each opening, a cut-away portion extending along each side of said series of slots to provide elongated seats for receiving a frame, a frame having a generally rectangular opening formed therein, the sides of said frame being adapted for engagement with the elongated seats formed in said plate, a pair of elongated metal members pivoted at the respective opposite ends of said frame, each member having a portion extending the width of said series of slots whereby it is adapted to grip the ends of film strips protruding beyond said slots, and a spring associated with said member to force said gripper portion into engagement with the frame, each member including a handle portion to permit said clipping portion to be released from engagement with the frame by pressure exerted on said handle, and a transversely extending stop at one end of said frame, the gripper portion of the adjacent clip being disposed between said stop and the inner edge of said frame.

2. A film holder for a combination film holder and guide comprising, in combination, an elongated metal frame having a generally rectangular opening formed therein, a spring clip at each end of said frame, each clip including a transverse portion extending substantially the whole width of said opening, means for pivotally mounting said clip on said frame, a spring for urging said transverse portion into engagement with said frame, and a handle portion for releasing said transverse portion from engagement with the frame against the pressure of said spring, and a transversely-extending stop at one end of said frame, said stop consisting of a strip of material disposed between the pivot and the transverse portion of the adjacent clip.

EDWIN D. PARSONS.

REFERENCES CITED

The following references are of record in the file of this patent:

UNITED STATES PATENTS

| Number | Name | Date |
|---|---|---|
| 1,113,288 | Barnes et al. | Oct. 13, 1914 |
| 1,365,975 | Folmer | Jan. 18, 1921 |
| 2,401,623 | Dye et al. | June 4, 1946 |
| 2,489,548 | Ullman | Nov. 29, 1949 |